March 30, 1943.  W. D. HALL  2,314,877
FLUID VELOCITY MEASURING DEVICE
Filed Oct. 31, 1940
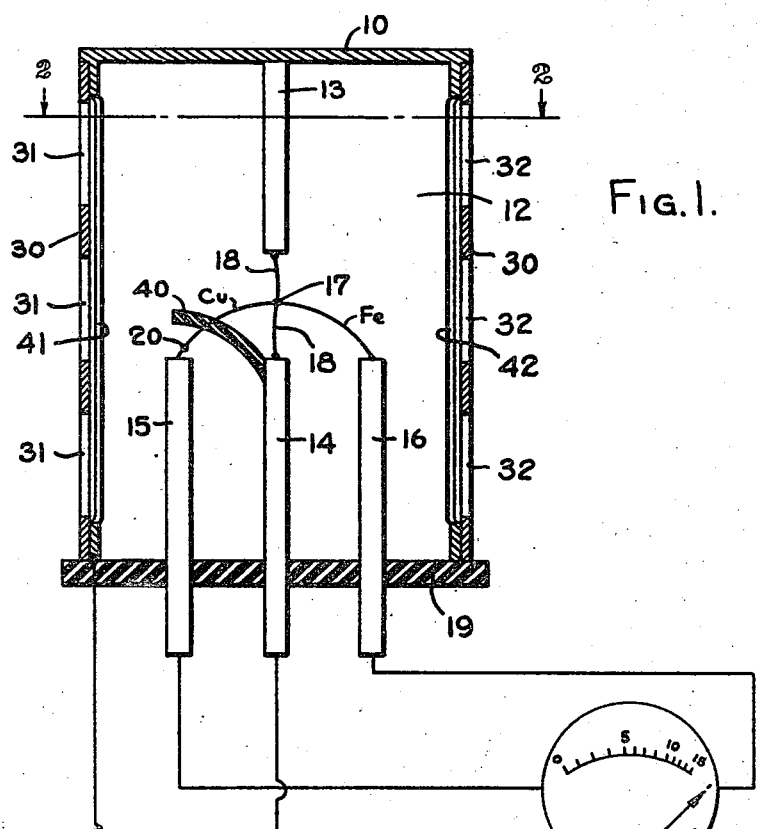
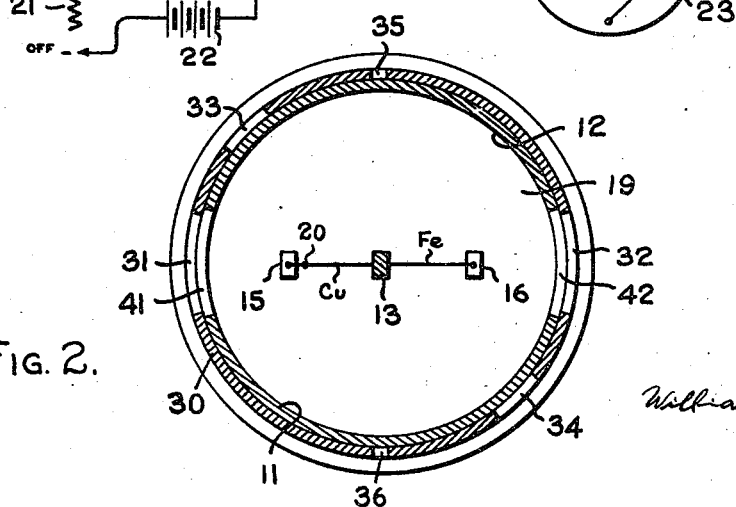
Inventor
William D. Hall.

Patented Mar. 30, 1943

2,314,877

UNITED STATES PATENT OFFICE 2,314,877

FLUID VELOCITY MEASURING DEVICE

William D. Hall, Elkins, W. Va.

Application October 31, 1940, Serial No. 363,716

11 Claims. (Cl. 73—204)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to condition-responsive devices and has as its primary object the provision of a thermocouple anemometer that is more efficient as well as more reliable than prior anemometers of this specific type. Another object is to provide a simple thermal anemometer and one that may be easily adjusted. Still another object is to provide a simple and reliable means for conveniently changing the range of an anemometer.

I have found several sources of error, heretofore unrecognized, in present designs of thermocouple anemometers. These errors are completely overcome by use of my invention. One error is due to convection air currents being set up by the heating wire. The convection air currents in prior anemometers add to, subtract from, or otherwise modify the actual flow of air through the measuring device when low air speeds are measured. Hence, the position of the prior art anemometers at the time a reading is taken has a considerable effect upon the reading obtained. For example, if it is desired to measure small drafts the velocity of which are the order of one-half foot per second and the instrument is held to measure the horizontal component of the drafts, the convection currents of the heating wire will be upward and will not directly add to or subtract from the measured air. There will be some effect, however. If, on the other hand, the instrument is held in the path of vertical drafts, say air currents rising from the floor to the ceiling of a room, the convection currents of the heating wire will add to the measured air speed. If, on the other hand, the drafts to be measured are passing down from the ceiling toward the floor, the convection air currents of the heating wire will oppose the small drafts approaching the heating wire and will reduce the effective reading.

Since large velocities are measured by so restricting the entrance passageway that small velocities result, errors are also present when large velocities are measured.

Moreover, I have found that heat from the heating wire affects the "cold junction" of the thermocouple, often by conduction through the wires and also by convection through the air. The amount of this heating varies greatly under different circumstances and causes very serious errors in reading.

By, (1) using a very fine heating wire so that the convection air currents set up thereby are a minimum, (2) using very small thermocouple wires so that the conducted heat is a minimum, and (3) then welding the heating wire to the thermocouple "hot junction" so that the heat generated by the heating wire is transferred very efficiently to the "hot junction" with very little heat dissipated elsewhere; the operation and accuracy of the instrument as compared to that of prior thermocouple anemometers is remarkably improved. Great accuracy, without sacrifice in sensitivity, is obtained.

By completely isolating the heating circuit and the thermocouple circuit, except at the point of the weld, it is possible to utilize a novel method of adjustment which gives the anemometer considerably greater accuracy than has been possible with prior anemometers of the thermal type. The novel method of adjustment consists merely in shielding the thermocouple and heater wires so they are not affected by air movements and then adjusting the heater current until the instrument reads a zero value of air speed. This method of adjustment compensates for numerous errors that ordinarily existed with prior methods.

To change the range of the anemometer, two cylinders are utilized, one outside of the other. The air flow measuring means is located inside the inner cylinder. One of the cylinders is stationary and has holes therethrough in fixed relation to the air flow measuring means. The other cylinder is movable and has a plurality of holes which may be rotated either into or out of line with the holes of the stationary cylinder. This enables the range of the anemometer to be changed by rotation of the movable cylinder. If the movable cylinder is rotated so that all of the holes of the stationary cylinder are completely covered, the instrument is in a shielded condition and may then be used to cary out the novel adjustment method heretofore mentioned.

The specific details of one embodiment of my invention are shown in the accompanying drawing of which Figure 1 is a vertical section of the instrument head; the rheostat and direct current supply and voltage measuring device being shown schematically. Figure 2 is a sectional view of the head along line 2—2 of Figure 1.

An inner cylinder 10 has side pieces 11 and 12 which define between them two elongated slots 41 and 42. As shown in Figure 2, these slots are diametrically opposite each other and constitute the sole openings in the side walls of cylinder 10. At its lower end, the cylinder 10 is rigidly fastened to the base 19 which is made of insulating material. Located outside the cylinder 10 is a second cylinder 30. Cylinder 30 is not rigidly fastened to the base 19 nor to cylinder 10 but is freely rotatable about its central axis. The outer cylinder 30 has openings therein of various sizes. These holes are arranged in vertical rows. A row of holes 31, and a second row 32 diametrically opposite row 31, have holes of relatively large size. Two other rows of holes 33 and 34 are opposite each other and have holes somewhat smaller than the holes 31, 32. Rows 35 and 36 composed of a number of small holes are also found in the outer cylinder 30. This cylinder includes a closed area between hole 31 and hole 36, and a second closed area between hole 32 and hole 35, where no holes of any kind exist. Since cylinder 30 may be freely rotated, it is possible to move the same around cylinder 10 so that holes 41 and 42 are completely covered by said closed area so that no air can enter or leave the inside of the measuring head. The measuring head of Figure 1 may be held horizontally or vertically in a stream of moving air and so that air will enter the head through hole 42 and affect the sensitive element 17. The amount of air passing through the head is measured by element 17 as hereinafter described. If low air speeds are to be measured, say those less than 15 feet per second, the openings 31 and 32 are rotated relatively in line with openings 41 and 42. For higher speeds, cylinder 30 is rotated until openings 33 and 34 are aligned with 41 and 42. For very high speeds openings 35 and 36 are rotated in line with holes 41 and 42. When making measurements with either holes 33, 34 or 35, 36 in line with holes 41, 42, the reading obtained from instrument 23 is multiplied by a suitable constant to obtain the exact air speed.

The air speed sensitive element 17 is of the thermocouple type. This element is supported by metal posts 13, 14, 15 and 16. Connected from posts 13 to 14 is the heating wire 18. The thermocouple wires Cu and Fe are welded to wire 18 at a common so-called "hot junction 17." The wire Cu does not connect to post 16 but is joined at point 20 with another wire (of the same composition as that of wire Fe) which does connect to post 15.

Current is supplied to heating wire 18 from a dry cell or flashlight battery 22 through a rheostat 21. The output of the thermocouple 17 is measured on a direct current microvoltmeter 23. When no current flows in the meter 23 the pointer is at the extreme right of the scale, as shown. When thermocouple 17 is heated, the E. M. F. produced causes the pointer of meter 23 to rotate counterclockwise.

To adjust the instrument for operation, the cylinder 30 is rotated until it completely closes both slots 41 and 42. Under these conditions no air can enter or leave the inner cylinder and the equivalent of zero air speed is obtained. The rheostat 21 is then adjusted until the pointer reads zero ("0"). The outer cylinder 30 is then rotated to admit air, for example it may be rotated until holes 31 and 32 align with 41 and 42. The instrument is then held in the path of air flow to be measured. This method of adjustment eliminates certain errors inherent in prior thermocouple anemometers. In the past, the instruments have been adjusted by holding a predetermined voltage across the heating wire or in some instances by holding a constant current in the wire. In order to measure such voltage or current to ascertain if it was constant, a second meter, or a switch enabling double use of one meter, was necessary. No such parts are needed with my invention. If due to exposure to the atmosphere, the heating wire should corrode, the heating effect of a constant voltage or current can change the calibration of prior instruments. This is not true with my invention since my adjustment method effects a predetermined heating rather than a predetermined voltage or current. Moreover, devices of the closest prior art are subject to errors when used in atmospheres of different barometric pressure from that calibrated. At low altitudes, a given voltage will not produce as much rise in temperature of wire 18 as it will at high altitudes. Hence prior devices will show an appreciable air speed in high pressure atmospheres even though there is no air flowing. My device is adjusted to zero at the pressure where the instrument is to be used and is not subject to pressure errors.

When air flows across the wire 18, heat is carried away in quantity depending on the air velocity. If the air flow is rapid, considerable heat is carried away and the pointer revolves from zero and comes to rest at a high reading, say 15. If the air flow is slow, the heat carried away will be small and the pointer will assume a position slightly above zero, say 1.0

I will now proceed to describe the most important finding disclosed in these specifications. The heat generated in wire 18 must be dissipated by convection, conduction, or radiation. The amount lost by radiation depends on the area, color, and temperature of the wire. For given air speeds, the area and temperature remain fairly constant throughout the life of an instrument. The color may change with appreciable effect on the proportionate loss between radiation and convection. Hence, radiation is undesirable. Heat may be lost by conduction through wires Cu and Fe. Loss by conduction in wire Cu is particularly undesirable as it affects the temperature of the so-called "cold-junction" 20. This heating effect on junction 20 occurs only after a time lag and therefore prior devices admit of erroneous reading unless the operator waits until a steady state is reached. If continuously varying low speed winds are measured, prior devices are particularly erroneous.

A further disadvantage of prior devices has been mentioned, namely, self-convections of wire 18 affecting the air flow to be measured.

I have overcome the disadvantages abovementioned by using small wires at 18, Cu, and Fe. A small heating wire, say under 0.002 inch, in diameter has less self-convection than large wires. Moreover, the heat it will supply by conduction to 20 is small, particularly if the wire Cu is also small, say under 0.002". While I state as the upper size limit, the figure 0.002 inch, the size should be smaller if maximum effectiveness of my findings are to be realized. Hence wires of 0.001 inch or less, in fact even 0.0005 inch, are to be desired.

The wire 18 may be of any suitable material usually used as heaters for thermocouples and wires Cu and Fe should be two efficient alloys such as are often used in thermocouples. Preferably the three wires 18, Cu, and Fe should be of such composition that they may be welded. Welding creates a very efficient heat transfer, thereby cutting down the temperature rise and self-convection required of wire 18 in order to obtain a given temperature rise of wires Cu and Fe. All three wires 18, Cu, and Fe are welded together at a common junction 17.

A shield 40 may be located between junctions 17 and 20. This is desirable when the wires used are larger than 0.001 inch but not needed when very small wires are used. It is shown in Figure 1 but omitted from Figure 2. It prevents convections from wire 18 from affecting cold-junction 20. The posts 15 and 16 should preferably be composed of the same material as that of wire Fe.

I claim to have invented:

1. In an air-speed measuring device; a first circuit consisting of a heating wire no greater than 0.002 inch thick, means for forcing current through said heating wire, and a rheostat for adjusting such current; a second circuit comprising a thermocouple having a hot junction, said hot junction being composed of wires no greater than 0.002 inch in diameter one of which is welded to the heating wire at a single junction point of connection, and a meter for measuring the output of said thermocouple; said connection constituting the sole electrical connection between said first and second circuits; and means for selectively exposing to or isolating the connection from the heat-carrying away effects of the air to be measured.

2. In an air-speed measuring device, a first circuit comprising the following in series, a heating wire, a rheostat, and a source of electrical supply; a second circuit comprising a thermocouple having a hot junction welded to said heating wire to constitute the sole electrical connection between said circuits, and a meter for measuring the output of said thermocouple; said meter constituting the sole measuring instrument of the device; and a range changing device comprising movable means adapted to move to a plurality of positions one of which completely isolates said heating wire from all fluid motion to enable calibration of the device, a second of which positions permits a predetermined percentage of the air velocity to be measured to pass over said wire, and a third of which restricts the quantity of air that passes across the connection.

3. In a fluid-speed measuring device; a heating wire the diameter of which is no greater than 0.001 inch, a thermocouple having a hot junction composed of wires no greater than 0.001 inch in diameter and a cold junction connected to said hot junction solely by a short length of one of said thermocouple wires whose diameter is no greater than 0.001 inch, said hot junction being welded to said heating wire, means whereby current may be forced through said heating wire, means for measuring the output of said thermocouple, and means whereby the heating wire may be moved to either a vertical or a horizontal position and at either position exposed to moving fluid.

4. In an air-speed responsive device, a heating wire the diameter of which is less than 0.002 inch, thermocouple means comprising wires not greater than 0.002 inch in diameter and in intimate thermal connection with the heating wire at a single point only, said thermocouple means including a hot junction adjacent said point of connection and a cold junction close to the hot junction, means for passing current through the heating wire, means responsive to the output of said thermocouple, and means supporting said heating wire and said hot and cold junctions in the path of flow of moving fluid.

5. In a device responsive to fluid flow, a thermocouple having a hot-junction, heating means for heating the hot-junction, said heating means including means for varying the amount of heat energy supplied to said hot junction, housing means surrounding said hot junction and closely spaced therefrom, said housing means defining an opening therein to expose the hot-junction to fluid flow and including means whereby all openings thereof may be completely closed to stop all fluid flow therein, and a meter which measures the output of said thermocouple both when said housing means is closed and open, whereby the meter may be used for checking purposes when the housing means closed and for fluid-measurement purposes when open.

6. In a fluid-speed measuring device; fluid-speed measuring means primarily responsive to fluid speed and calibrated in terms thereof, said fluid-speed measuring means including a fluid-speed sensitive element thereof, a first housing defining openings in opposite side walls thereof and surrounding said fluid-speed sensitive element, and a second housing closely spaced with respect to the first housing and movable with respect thereto to either of two angular positions, said second housing defining holes respectively in opposite sides thereof which align with the holes of the first housing when the second housing is in one of said angular positions and also defining additional holes smaller than all of the other holes and sidewise displaced from the above-recited holes of the second housing, said additional holes being respectively in opposite sides of said second housing and so located as to align with the holes of the first housing when the second housing is in the other of said angular positions.

7. In a fluid-speed meter, first and second cylindrical housings having a common axis and one of which fits closely inside the other, a base supporting one of said housings, the other of said housings being movable angularly about the axis of the cylinders, said first cylinder including a series of pairs of holes of effectively different sizes and holes of the individual pairs being diametrically opposite each other in the first cylinder, said second cylinder defining two holes on opposite sides thereof each larger than the smallest holes of the first cylinder, and fluid-speed measurement means including a fluid-speed responsive element affected by the fluid speed passing between the oppositely disposed holes of said second cylinder.

8. In a fluid-speed responsive device; fluid-speed sensitive means comprising conductors each less than 0.0000032 square inch cross section, said conductors forming a thermocouple and a heater for heating the thermocouple, said thermocouple including a hot junction adjacent to and responsive to heat from the heater and a cold junction close to the hot junction, means forcing current through the heater, means whereby said hot and cold junctions as well as said heater are located in the path of flow of moving fluid to whose speed it is desired for the device to respond, whereby said cold junction is subject to substantially ambient temperature conditions, and means responsive to the output of said thermocouple for giving indications of fluid speed.

9. An air-speed metering device having the invention of claim 6 and in addition including means whereby the first and second housings may be moved to a position to stop all air flow therethrough; said fluid speed sensitive element comprising wires inside the inner housing and forming a thermocouple circuit with a hot junction and a heater circuit for heating said hot junction, said wires having a thickness no greater than 0.002 inch; said fluid speed measuring means including an electrical measuring instrument, for measuring the output of the thermocouple circuit; said measuring instrument constituting the sole measuring instrument incorporated in the device; and a rheostat in the heater circuit for adjusting the current flow therethrough.

10. In a fluid speed responsive device, an instrument head comprising an enclosure having openings on different sides thereof to effectuate flow of fluid through the device when the latter is placed in a region of moving unconfined fluid, short wires forming both a thermocouple circuit and a heater circuit, said wires being no greater than 0.002 inch thick and forming a cold junction as well as a hot junction with the latter in intimate thermal contact with the heater circuit, means supporting said wires in said enclosure to expose the same to fluid flowing through the enclosure and thereby permit the hot junction to be cooled in accordance with the fluid flow in the enclosure and enable the cold junction to remain at substantially ambient temperature, means whereby current may be supplied to said heater circuit, and means responsive to the output of said thermocouple circuit.

11. The device defined in claim 5 in which the meter is the only meter of the device, and in which the means whereby all openings may be completely closed is a covering plate arranged to be moved over the said opening.

WILLIAM D. HALL.